United States Patent
Harrington et al.

(10) Patent No.: US 9,555,324 B1
(45) Date of Patent: Jan. 31, 2017

(54) DYNAMIC EFFECTIVENESS FOR VIRTUAL ITEMS

(71) Applicant: KABAM, INC., San Francisco, CA (US)

(72) Inventors: Clifford J. Harrington, San Francisco, CA (US); Kent Wakeford, Hillsborough, CA (US)

(73) Assignee: Kabam, Inc., San Francisco, CA (US)

( * ) Notice: Subject to any disclaimer, the term of this patent is extended or adjusted under 35 U.S.C. 154(b) by 543 days.

(21) Appl. No.: 13/934,114

(22) Filed: Jul. 2, 2013

(51) Int. Cl.
*A63F 13/12* (2006.01)
*A63F 13/30* (2014.01)

(52) U.S. Cl.
CPC .................... *A63F 13/12* (2013.01)

(58) Field of Classification Search
CPC .......... G06F 15/00; A63F 13/10; A63F 13/12
See application file for complete search history.

(56) References Cited

U.S. PATENT DOCUMENTS

| | | |
|---|---|---|
| 6,896,618 B2 | 5/2005 | Benoy |
| 6,913,536 B2 | 7/2005 | Tomizawa |
| 7,713,118 B2 | 5/2010 | Roemer |
| 8,147,328 B2 | 4/2012 | Carroll |
| 8,246,466 B2 | 8/2012 | Herrmann |
| 8,255,297 B2 | 8/2012 | Morgenstern et al. ......... 705/30 |
| 8,287,383 B1 * | 10/2012 | Etter ........................ H04L 67/38 463/42 |
| 8,292,743 B1 | 10/2012 | Etter et al. ....................... 463/42 |
| 8,296,781 B1 | 10/2012 | Lebaredian |
| 8,328,642 B2 | 12/2012 | Mosites et al. ................ 463/42 |
| 8,348,747 B2 | 1/2013 | Arezina |
| 8,360,870 B2 | 1/2013 | Herrmann |

(Continued)

FOREIGN PATENT DOCUMENTS

WO 2014210286 12/2014

OTHER PUBLICATIONS

"Difference in Gameplay Mechanics Between Gold, Silver and Bronze" [online], Apr. 2, 2012 [retrieved Jun. 1, 2015]. Retrieved from the Internet <URL:http://forum.bioware.com/topic/309690-difference-in-gameplay-mechanics-between-gold-silver-and-bronze/>, 7 pages.

(Continued)

*Primary Examiner* — Dmitry Suhol
*Assistant Examiner* — Ankit Doshi
(74) *Attorney, Agent, or Firm* — Sheppard Mullin Richter & Hampton LLP (57) ABSTRACT

An online gaming system allowing for adjustment of the effectiveness of virtual items. The system may comprise one or more processors configured to execute computer program modules. The system may include a game module configured to execute an instance of an online game and to implement the instance of the online game to facilitate participation of users in the online game. The system may include a user module configured to manage user information associated with the users in the online game. The system may include a shop module configured to present virtual items to the users in a virtual shop. The system may include a spend history module configured to obtain user spend information that characterizes past spending by the users on virtual items. The system may include an item effectiveness module configured to determine an effectiveness level of virtual items available in the online game.

18 Claims, 4 Drawing Sheets

(56) References Cited

U.S. PATENT DOCUMENTS

| | | |
|---|---|---|
| 8,366,550 B2 | 2/2013 | Herrmann |
| 8,388,452 B2 | 3/2013 | Auterio |
| 8,527,332 B2 | 9/2013 | Selby |
| 8,944,908 B1 | 2/2015 | Wakeford |
| 9,205,338 B1 | 12/2015 | Wakeford |
| 2003/0119576 A1 | 6/2003 | McClintic |
| 2003/0119581 A1 | 6/2003 | Cannon |
| 2005/0076002 A1 | 4/2005 | Williams |
| 2005/0113164 A1 | 5/2005 | Buecheler |
| 2005/0192097 A1 | 9/2005 | Farnham |
| 2007/0004496 A1 | 1/2007 | Gordon |
| 2007/0066403 A1 | 3/2007 | Conkwright |
| 2008/0182664 A1 | 7/2008 | Kaplan |
| 2008/0200244 A1 | 8/2008 | Rowe |
| 2008/0234034 A1 | 9/2008 | Tessmer |
| 2008/0266250 A1 | 10/2008 | Jacob |
| 2008/0293466 A1 | 11/2008 | Arakawa et al. .............. 463/7 |
| 2008/0318668 A1 | 12/2008 | Ching |
| 2009/0051114 A1 | 2/2009 | Robbers |
| 2009/0181771 A1 | 7/2009 | Sogabe |
| 2009/0181774 A1 | 7/2009 | Ratcliff |
| 2010/0144424 A1 | 6/2010 | Rogers |
| 2010/0166065 A1 | 7/2010 | Perlman |
| 2010/0273557 A1 | 10/2010 | Miyaki |
| 2010/0279762 A1 | 11/2010 | Sohn |
| 2010/0304839 A1 | 12/2010 | Johnson |
| 2011/0093361 A1 | 4/2011 | Morales |
| 2011/0106607 A1 | 5/2011 | Alfonso |
| 2011/0312423 A1 | 12/2011 | Mosites |
| 2012/0009997 A1 | 1/2012 | Youm |
| 2012/0150695 A1 | 6/2012 | Fan |
| 2012/0172098 A1 | 7/2012 | Baker |
| 2012/0244950 A1 | 9/2012 | Braun |
| 2012/0322545 A1 | 12/2012 | Arnone |
| 2013/0005437 A1 | 1/2013 | Bethke et al. .............. 463/25 |
| 2013/0014033 A1 | 1/2013 | Hamick |
| 2013/0066695 A1 | 3/2013 | Just |
| 2013/0079082 A1 | 3/2013 | Bancel |
| 2013/0079145 A1 | 3/2013 | Lam |
| 2013/0085838 A1 | 4/2013 | Tennenholtz |
| 2014/0122720 A1 | 5/2014 | Jung |
| 2014/0128161 A1 | 5/2014 | Latta |
| 2014/0274308 A1* | 9/2014 | Guinn ............. G07F 17/3267 463/25 |
| 2014/0358651 A1 | 12/2014 | Koh |
| 2015/0005052 A1 | 1/2015 | Harrington |
| 2015/0011277 A1 | 1/2015 | Wakeford |

OTHER PUBLICATIONS

A Cautious Celebration of Pay-or-Wait to Play Games, URL: http://www.michaelbraun.me/2014/07/a-cautious-celebration-of-pay-or-wait-to-play-games [retrieved Jan. 21, 2016] 3pgs.

* cited by examiner

DYNAMIC EFFECTIVENESS FOR VIRTUAL ITEMS

FIELD OF THE DISCLOSURE

This disclosure relates to systems and methods for adjusting the effectiveness of virtual items within a virtual space to create an enhanced gameplay experience.

BACKGROUND

Systems for online gaming may comprise servers including one or more processors configured to execute one or more computer modules. Instances of online gaming executed by one or more of the modules may present a virtual space representative of the online game. The virtual space may be presented to users on a user computing platforms, such as a smartphones, PC's, and/or other platforms capable of presenting the virtual space. The virtual space may provide users of the online game with the ability to acquire virtual items for use within the instance of the online game. Virtual items may include weapons, tools, food, goods, currency, and/or other items. In particular, users may acquire virtual items by purchasing virtual items in a virtual shop presented within the virtual space. Purchase may include purchasing items using virtual currency.

Virtual items may have attributes which affect their use within the virtual space. The effectiveness of the virtual item in its use within the virtual space may correspond to a level of desire for users to acquire, maintain use, and/or discard the virtual item throughout gameplay.

SUMMARY

One aspect of the disclosure relates to an online gaming system allowing adjustment of the effectiveness of virtual items. The system may comprise one or more processors configured to execute computer program modules. The system may include a game module configured to execute an instance of an online game and to implement the instance of the online game to facilitate participation of users in the online game. The system may include a user module configured to manage user information associated with the users in the online game. The user information may include inventories of virtual items available for use by the users in the online game. The user information may include first user information including a first inventory of virtual items available for use by a first user, and second user information including a second inventory of virtual items available for use by a second user.

The system may include a shop module configured to present the virtual items to the users in a virtual shop within the online game. The virtual shop may allow purchase of one or more virtual items available for use by users of the online game using virtual currency.

The system may include a spend history module configured to obtain user spend information that characterizes past spending by the users on virtual items. The user spend information may include a first user spend information that characterizes past spending by the first user on virtual items and a second user spend information that characterizes past spending by the second user on virtual items.

The system may include an item effectiveness module configured to determine an effectiveness level of virtual items in the online game. The determination may include an adjustment in the effectiveness level of virtual items which may change the desire the user may have to acquire the virtual items and/or continue use of the virtual items, for enhancing the gameplay experience. The determination may be based, at least in part, on user spend information. For example, effectiveness level of a first item in the first inventory of the first user may be determined based, at least in part, on the first user spend information related to the first user, to enhance the gameplay experience for the first user. The effectiveness level of a second item in the second inventory of the second user, may be determined based on the second user spend information related to the second user, to enhance the gameplay experience for the second user. The determination may be based, at least in part, on a comparison of the first user spend information associated with the first user and the second user spend information associated with the second user, to provide individualized experiences for the two (or more) users. An implementation of the determination may include adjusting the effectiveness level of a virtual item from a base effectiveness level of the item.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
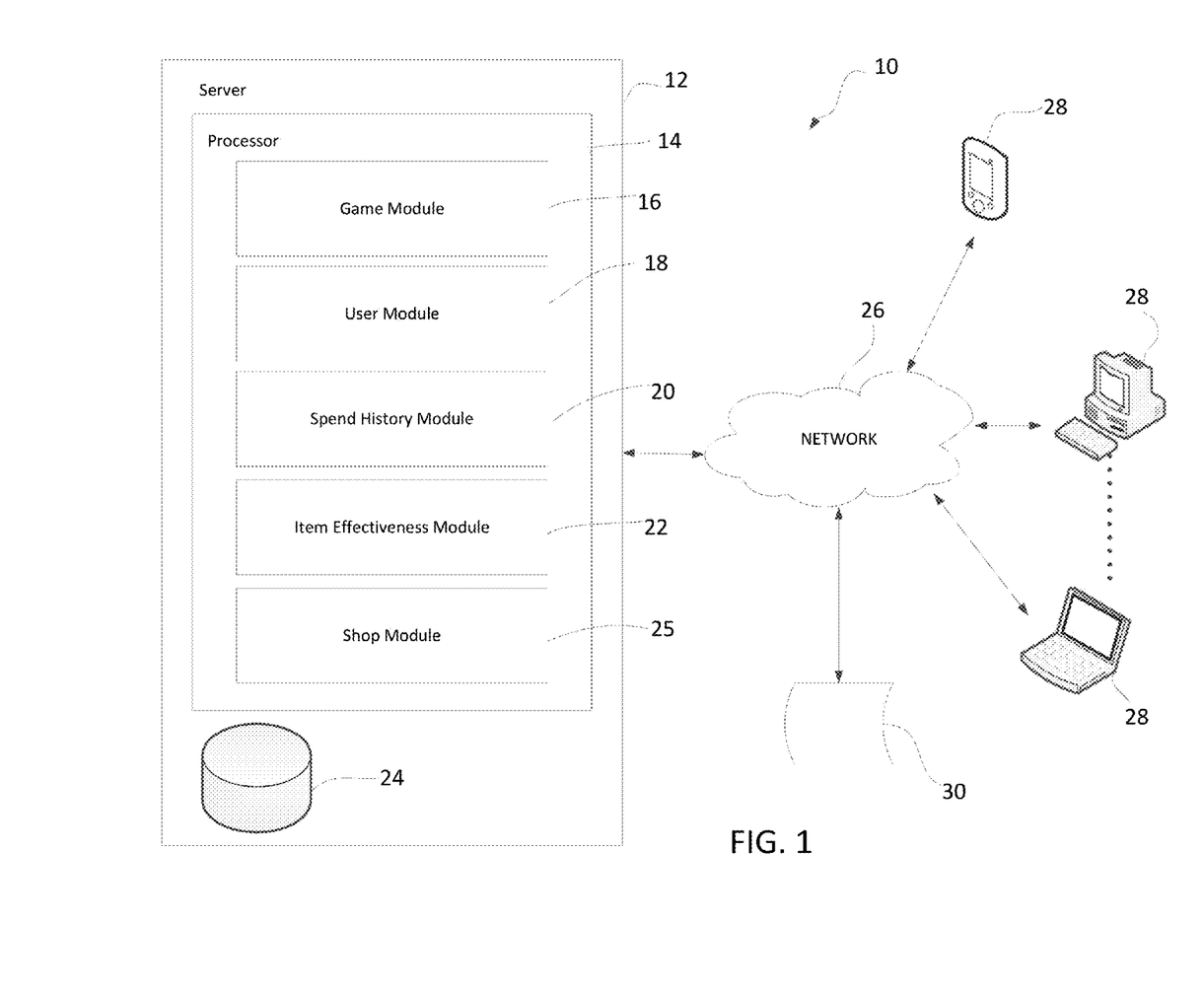
FIG. 1 illustrates a system for adjusting the effectiveness of virtual items associated with a virtual space.

FIG. 1 illustrates a system 10 configured to determine the effectiveness of virtual items within a virtual space. The virtual space may include, for example, an online game. The virtual items may include one or more items available for use by the users of the virtual space. Such items may include, for example, weapons, tools, potions, food, goods, currency, and/or other items. The effectiveness of one or more of the items may be adjusted to enhance gameplay experience for the users of the online game. An adjustment to the effectiveness of a virtual items may impact the relative desire for users to acquire, maintain user, or discard virtual items available for use within the virtual space.

The effectiveness may be adjusted, at least in part, based on user spend information, and/or other information. User spend information may characterize past spend history of the users on virtual items (e.g., in the present virtual space and/or online game, and/or in other virtual spaces and/or online games). The adjustment may enhance user experience within the virtual space by encouraging interaction with virtual items available for purchase or acquisition within the game provided in the instance of the online game implemented in the virtual space.

The virtual space may be configured to provide the users with a virtual shop. In the context of the virtual shop, offers for sets of one or more virtual items may be presented to the users of the virtual space for purchase using virtual currency and/or other consideration. The spend information may characterize past user spending at these virtual shops. The spend information may characterize past spending related to trade or barter of virtual items with other users of the virtual space, either through the use of virtual currency or through trade of other virtual items and/or other considerations. The spend information may characterize past spending related to other purchases outside of the virtual space (e.g., real purchases).

Providing the virtual space may include hosting the virtual space over a network 26, such as the Internet. A host server may include one or more processors configured to execute one or more computer modules for implementing an instance of an online game and to facilitate the participation of one or more users in the online game. The host server may be a game server 12.

The computer program modules may include one or more of a game module 16, a user module 18, a spend history module 20, an item effectiveness module 22, a shop module 25, and/or other modules. The server 12 may be configured to communicate with one or more client computing platforms 28, according to client/server architecture. The client platforms 28 can include, for example, a personal computer (PC), gaming console (e.g., Xbox, Wii, etc.), mobile device, smartphone, laptop, or other device capable of presenting the virtual space to the user. Thus, the users may access system 10 and/or the virtual space via client computing platforms 28.

The game module 16 may be configured to implement the instance of the virtual space executed by the computer modules to determine state of the virtual space. The state may then be communicated (e.g., via streaming visual data, via object/position data, and/or other state information) from server 12 to client computing platforms 28 for presentation to users. The state determined and transmitted to a given client computing platform 28 may correspond to a view for a user character being controlled by a user via the given client computing platform 28. The state determined and transmitted to a given client computing platform 28 may correspond to a location in the virtual space (e.g., location in the game). The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 28) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 16 is not intended to be limiting. The game module 16 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 16, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 28. The users may interact with each other through communications exchanged within the virtual space. Such communications may include one or more of textual chat, instant messages, private messages, voice communications, and/or other communications. Communications may be received and entered by the users via their respective client computing platforms 28. Communications may be routed to and from the appropriate users through server 12 (e.g., through game module 16).

The user module 18 may be configured to access and/or manage one or more user profiles and/or user information associated with users of the system 10. The one or more user profiles and/or user information may include information stored by server 12, one or more of the client computing platforms 28, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, browsing history of users, a client computing platform identification associated with a user, a phone number associated with a user, and/or other information related to users.

Figure 2:
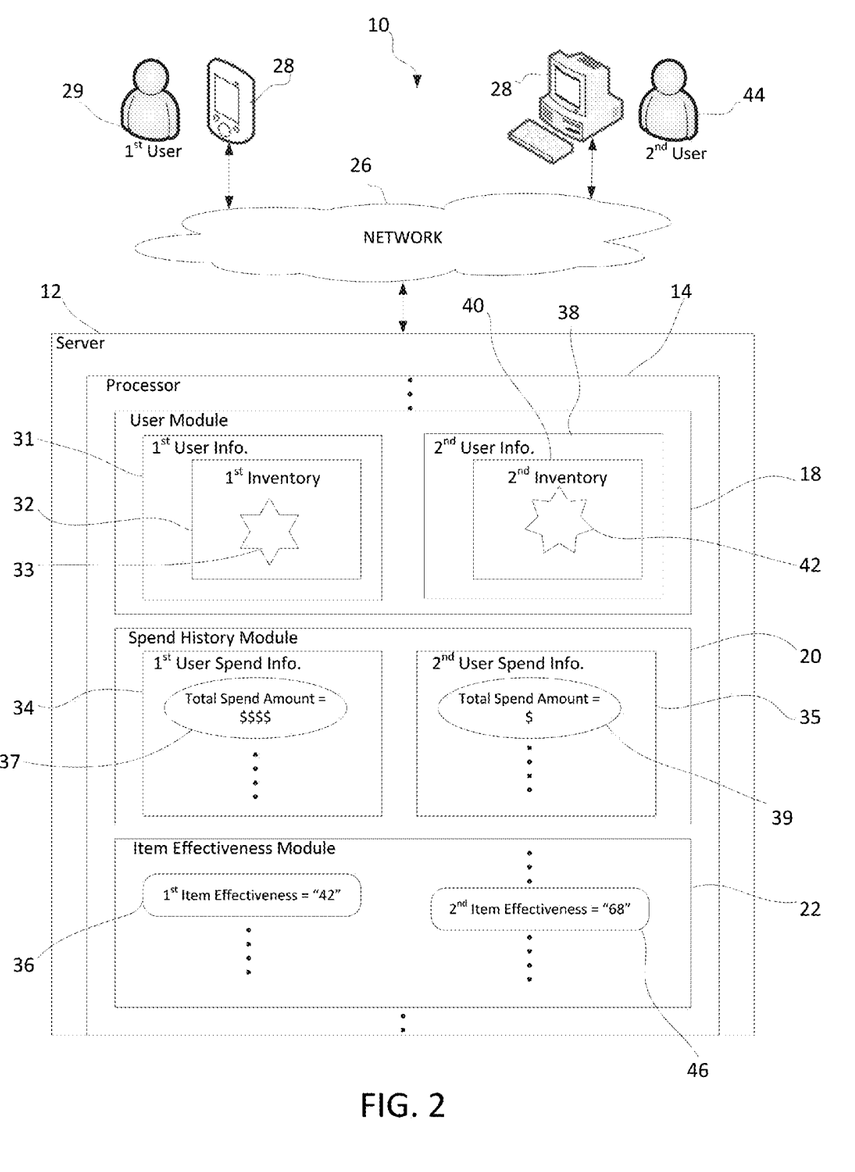
FIG. 2 illustrates a system of FIG. 1 showing a first user and a second user, and illustrating the implementation of a change of effectiveness of virtual items based on first and second user spend information.

The user module 18 may be configured to manage the user's "inventory" of virtual items and/or currency that the users can use within the virtual space. A user may have a game "inventory" of one or more virtual items and/or currency that the user can use (e.g., by manipulation of one or more user characters or other user controlled element, and/or other items) to perform in-game actions within the virtual space. The inventory can be determined on a game-to-game basis for one or more games available within the virtual space, or for one or more games in one or more other virtual spaces. The inventor may encompass multiple inventories of virtual items across multiple games played by the user. By way of illustration, FIG. 2 depicts first user information 31 within the user module 18. First user information may include a first inventory 32, which may include one or more virtual items available for use by a first user 29. The first inventory 32 can include, for example, a first virtual item 33 among the one or more virtual items. First virtual item 33 may be any one of a weapon, tool, potion, food, good, currency, and/or other items. First virtual item 33 may represent a grouping of multiple virtual items from identifiable groups of items such as weapons (e.g. swords, shields, guns, etc.), tools (e.g. hammers, keys, etc.), potions (e.g. to cast spells on enemies, heal damage, etc.), foods (e.g. to build health, feed citizens, etc.), goods (e.g. lumber, clothing, work animals), currency (e.g. coins, cash, gold bars, etc.), and/or other groups of items.

Virtual items may be acquired by the user in one or more of a variety of ways. For example, virtual items may be acquired through gameplay, purchased by the user in a virtual shop, received from another user, bestowed on the user as a part of a promotion, and/or acquired in other ways. Virtual items may have attributes which affect their use within the virtual space. The effectiveness of the virtual item in its use within the virtual space may correspond to a level of desire for users to acquire, maintain use, and/or discard the virtual item throughout gameplay.

Acquiring virtual items through gameplay may include acquiring items by completing tasks such as finishing levels, defeating enemies, obtaining status, and/or other tasks, and/or by other gameplay mechanisms. Users may decide to complete certain tasks in order to acquire and/or upgrade to virtual items which are the result of completing the task. Users may receive items from one or more other users. Users may receive items from interaction with objects positioned within the virtual space capable of real-time interaction, and/or other mechanisms. Bestowing of items as part of a promotion may include promotions implemented by the game module 16 to reward the user, and/or other mechanism implemented by the game module 16. Acquiring items from a virtual shop may include purchasing items from a virtual shop within the virtual space. Purchase may include purchasing items using virtual currency and/or other consideration. An instance of a virtual shop may be provided through the execution of a shop module 25, described in more detail below.

Returning to FIG. 1, a shop module 25 executed by processor 14 may be configured to facilitate the experience of purchase interactions of the one or more users of the virtual space. The shop module 25 may facilitate an instance of a virtual shop to be presented within the virtual space. The virtual shop may be a simulated space within the virtual space presented by game module 16 which is accessible by users and presents the views of the virtual shop to the one or more users. Users may access the virtual shop through one of a variety of ways. Users may access the virtual shop through the manipulation of one or more user characters associated with the user within the virtual space using control inputs and/or commands input by the users through client computing platforms 28. Users may access the virtual shop through control inputs and/or commands input by the users through client computing platforms 28 which automatically presents the instance of the virtual shop to the client computing platform 28, and/or other way of access. The instance of the virtual shop may be presented to users through a shop interface. The shop interface may be configured to present offers of sets of one or more virtual items to users. The shop interface may be configured to receive entry and/or selection of individual offers by the users to effectuate acceptance and/or purchase of the offers.

Manipulation of a character may include moving the one or more user characters through the virtual space using control inputs and/or commands input by the users through client computing platforms 28, to move the one or more characters to the simulated space designating the location of the virtual shop within the virtual space.

Users may use control inputs and/or commands not associated with the one or more user characters to access the virtual shop. Control inputs and/or commands may automatically present the instance of the virtual shop on the clients computing platform 28 (e.g., user selects a virtual shop button to automatically be taken to the virtual shop).

The simulated space of the virtual shop may have topography. The virtual shop may express ongoing real-time interaction by one or more users (e.g., may have limited stock of virtual items for sale which can be purchased by one or more users within the virtual space which can be depleted), and/or include one or more objects (e.g., one or more virtual items, a virtual teller, and/or other objects) positioned within the topography that may be capable of locomotion within the topography. The virtual shop may display the one or more virtual items available for purchase by the users. Users may view the one or more virtual items available for purchase. Users may purchase one or more virtual items using virtual currency, and/or other consideration. Transactions may take place with the virtual teller, through various other actions of the user within the instance of the virtual shop, and/or other transaction mechanisms.

As noted, the provision of a shop module 25 providing the instance of a virtual shop where users may purchase items is only one of many ways in which users may acquire virtual items. As such it is to be understood that the execution of the shop module 25 is not a necessary requirement for the implementation of the system 10 as related to users acquiring virtual items and related inventories.

The spend history module 20 may be configured to track historical spend information associated with a user. Spend history module 20 may be configured to monitor, assess, determine, discern, or otherwise obtain user spend information that characterizes past spending by the users. User spend information associated with other games either alternatively or in addition to the subject game may be considered. Spend information associated with the user for purchases other than with respect to games (e.g., real purchases) may also be considered.

User spend information may be obtained by spend history module 20 in one or more of a variety of ways. Obtaining users spend information may include one or more of receiving the information, accessing stored information, determining the information (e.g., from other obtained information), and/or obtaining the user spend information in other ways.

User spend information may be received from one or more other games played by the user in one or more other virtual spaces. User spend information from other games within the present virtual space and/or online game, and/or in other virtual spaces and/or online games, may be sent to the instance of the online game within game module 16 in order to unify multiple user spend information across multiple virtual spaces (e.g., games).

User spend information may be accessed from stored information which is stored by the instance of the online game provided by game module 16, and/or by other games played by the users in the virtual space of game module 16, and/or by one or more other virtual spaces, and/or other accessible stored information.

The user spend information may indicate and/or include one or more spend parameters, and/or other parameters. The one or more spend parameters may include one or more of spend velocity, spend frequency, total (or lifetime) spend, and/or other parameters. The spend parameters may characterize spending by a user within the present virtual space and/or online game with game module 16, and/or in other virtual spaces and/or online games.

Spend velocity may provide quantification of an amount of currency (real or virtual) spent by the user per unit time. Spend frequency may quantify a number of purchases completed per unit time. A total spend amount may quantify a total amount spent (e.g., lifetime spending, or other amount) by the user (e.g., within the game in the virtual space provided by game module 16, and/or across one or more other online games). One or more spend parameters may characterize average spending by the user at content driven points in one or more games. Examples of this may include, average spend during quest related in-game activities, average spend during player to player battles, and/or spend during other types of in-game activities.

User spend information may indicate and/or include user spend parameters on an item-to-item bases (e.g. when the user buys a swords). User spend information may indicate and/or include user spend parameters on purchases of a particular group of items (e.g. tracking when user buys weapons). User spend information may indicate and/or include user spend parameters on any purchase (e.g., within the instance of the game provided by game module 16, one or more other games within the virtual space provided by game module 16, one or more other games within other virtual spaces, and/or within other mechanisms for purchase).

Spend history module 20 may generate one or more spend parameter values, and/or other value, based on the one or more of the above described spend parameters. These spend parameter values may be used by the virtual item effectiveness module 22 as described below to implement one or more virtual item effectiveness determinations which are relevant to the one or more spend parameter values. The spend parameter value may be provided as any one or more of a numerical value, (e.g., spending $50/week may be represented as "50" for a spend parameter value based on the spend velocity parameter, and/or other numerical value), non-numerical value (e.g., graphically represented value), and/or by other valuation.

By way of illustration, FIG. 2 Illustrates a non-limiting example of a non-numerical spend parameter value. Included is a depiction of first user spend information 34 within spend history module 20 that characterizes past spending by the first user 29 on virtual items. FIG. 2 includes a depiction of second user spend information 35 within spend history module 20 that characterizes past spending by a second user 44 on virtual items. As shown, the first user 29 may have first user spend information 34 within spend history module 20 which may generate a spend parameter value (e.g., total spend amount 37), with the value shown graphically as "$$$$". Each "$" may represent levels of spending (e.g., "$" may represent one unit of $100 spent, and "$$$$" may represent four units of $100 spend or $400). The second user 44 is shown having second user spend information 35 within spend history module 20 generating a spend parameter value (e.g., total spend amount 39), with the value shown graphically as "$". Described in more detail herein, the spend history module 20 may implement a comparison of the depiction of "$$$$" to "$" which may indicate that the first user 29 has a total spend amount 37 which is more when compared to the total spend amount 39 of the second user 44. Again, although graphical depictions are shown, spend parameter values may be generated by numerically representative parameter values (e.g., $100 total spending generating a "100" total spend parameter value, and/or $400 total spending generates a "400" total spend parameter value). Numerically represented parameter values may also be used in value comparisons between users (e.g., "100" compared to "400").

Returning to FIG. 1, the item effectiveness module 22 may be configured to determine effectiveness levels of the virtual items in the instance of the online game. A determination of the effectiveness level of a virtual item may result in an adjustment of the effectiveness level of the virtual item, to enhance the gameplay experience of users using (or not using) the items. The effectiveness level may be determined based on, at least in part, user spend information obtained from the spend history module 20. By way of example in FIG. 2, the effectiveness level of the first item 33 in the first inventory 32 may be determined based on the first user spend information 34 within spend history module 20. The effectiveness level of the second item 42 in the second inventory 40 may be determined based on the second user spend information 35 within spend history module 20.

The effectiveness level determination may be based on user spend information including the one or more spend parameters, spend parameter values, or other parameter. By way of example continuing with FIG. 2, the effectiveness level of the first item 33 in the first inventory 32 may be determined based on the one or more spend parameter, spend parameter value, and/or other parameter, associated with the first user 29. The effectiveness level of the second item 42 in the second inventory 40 may be determined based on the one or more spend parameters, spend parameter values, and/or other parameters, associated with the second user 44. The process of determination can be carried out in one or more various ways described in more detail shortly below.

Once the item effectiveness level is determined by user spend information (e.g., spend parameters, spend parameter values, and/or other parameters) the item effectiveness module 22 may implement a setting of, or change/adjustment in an item effectiveness level of a virtual item. The effectiveness of the virtual item in its use within the virtual space may correspond to a level of desire for users to acquire, maintain use, and/or discard the virtual item throughout gameplay, therefore a change in effectiveness of an item may effectuate a change in user desire to acquire, maintain use, and/or discard the virtual items.

The setting or changing of the effectiveness level of virtual items may be based off one or more adjustments of the effectiveness level from a base effectiveness level of the virtual items. The base effectiveness level of the one or more virtual items may be a pre-determined level value which is set by the game module 16 to act as a base effectiveness level value. By way of example, the virtual items available for users in the online game may have effectiveness levels rated on a point scale such as 0-100, with zero being most ineffective for the intended purpose of the item, and 100 being the most effective for the intended purpose of the item. A base effectiveness level of a sword item may be set as "50" (e.g. out of 100 points), by the game module 16 at the start of the online game being played by a user. As the game is played, the setting or changing in the effectiveness level of the item may be adjusted based off of this base effectiveness level value. The numbering of effectiveness levels, and/or the number of levels described herein is purely illustrative. The various levels may be enumerated in other ways, and/or may include more or less levels. By way of non-limiting example, other scaling and/or rating and/or valuation could include qualitative valuation such as "ineffective", "effective", and "very effective", which may mean a general effectiveness of an item, and may be not numerically quantified.

The base effectiveness level of one or more virtual items may be set to zero, or no effectiveness at the start of an instance of the online game within game module 16. One or more virtual items may be initially ineffective in the initial start of an instance of the online game for one or more users, until item effectiveness levels for the one or more users can be determined and then an effectiveness level determination can be implemented. By way of example, a sword item may have a base effectiveness level of zero, and once item effectiveness module 22 determines an adjustment to the item effectiveness level, the item effectiveness module 22 may implement a setting or adjustment of the effectiveness level of the sword item.

The setting or changing of the effectiveness level may invoke a setting of, or change in, one or more attributes associated with the virtual item. Attributes may include, for example, power, agility, ease of use, speed, and/or other attribute. One or more attribute may be characterized by a rank or scale, for example a point scale from 0 to 100 as outlined above, or other scale, rating, and/or valuation for item attributes. The item effectiveness module 22 may then set, change, and/or adjust one or more attributes as an implementation of the determination of the item effectiveness level as outlined above.

One of the many ways the effectiveness level may be determined prior to implementation includes determining users spend information including past spending that characterizes the user as having one or more spend parameter values of high spending frequently, spending at high velocity, or meeting a threshold total spending amount, relative maximum threshold values set for the one or more spend parameter values. The threshold value may be a quantity which is pre-set by the game module 16, determined by a comparison executed by spend history module 20 with past generated parameter values of the user and/or other users, and/or both, and/or other determination mechanism. In this way of determination, a setting, change, and/or adjustment in effectiveness may be determined and subsequently executed.

By way of example, the game module 16 may set forth a base effectiveness level of a virtual item (e.g., a sword) at level 50 (e.g. out of 100) for any one or more attributes. The determination of change in item effectiveness level may be determined from the user spend information of the user including spend parameter values which meet or exceed pre-set threshold values (e.g., set by game module 16). The threshold values may be spending 10 times a week (or other frequency value), spending $20 of virtual currency per day (or other velocity value), spending a total of $1000 (or other total value), and/or other parameters. Meeting or exceeding these threshold values may result in determining an effectiveness level change (for example an increase or decrease by 20 "points" or other amount), and the resulting implantation of the change from (e.g., to higher or lower than) the base effectiveness level for any one or more attributes.

Another one of the many ways the effectiveness level may be determined prior to implementation includes determining users spend information including past spending that characterizes the user as having one or more spend parameter values of low spending frequently, spending at low velocity, or failing to meet a total spending amount, relative maximum threshold values set for the one or more spend parameter values. The threshold value may be a quantity which is pre-set by the game module 16, determined by comparison with past generated parameter values of the user and/or other users, and/or both, and/or other determination mechanism. In this way of determination, a setting, change, and/or adjustment in effectiveness may be determined and subsequently implemented.

By way of example, the game module 16 may set forth a base effectiveness level of a virtual item (e.g., a sword) at level 50 (e.g. out of 100) for any one or more attributes. The item effectiveness level may be determined from the user spend information of the user, including spend parameter values which meet or fail to exceed pre-set minimum threshold values (e.g., by game module 16). The minimum threshold values may be, spending 1 time a week (or other value), spending $2 of virtual currency per day (or other value), spending a total of $10 (or other value), and/or other parameters. Meeting or failing to exceed these threshold values may result in determining an effectiveness level change (for example an increase or decrease by 20 "points" or other point amount), and the resulting implantation of the change from (e.g., to higher or lower than) the base effectiveness level for any one or more attributes.

Another one of the ways the effectiveness level may be determined includes item effectiveness module 22 obtaining one or more comparisons which are executed within the spend history module 20, of user spend information (e.g., spend parameter values) between one or more users of the online game within game module 16. By way of example in FIG. 2, the first user 29 may have a relatively high spend parameter value (e.g., total spend amount 37, shown graphically as "$$$$") compared to the second user 44 spend parameter value (e.g., total spend amount 39, shown graphically as "$"). The item effectiveness module 22 obtains the comparison result (e.g., first user 29 having a relatively higher spend parameter than second user 44) from the spend history module 20, resulting in an item effectiveness determination which may be the first item effectiveness level 36 being adjusted relative the second item effectiveness level 46. Thus, in this way of determination, the item effectiveness module 22 will determine, then subsequently implement, a change and/or setting of the first item effectiveness level 36 (shown as "Level 42") relative to the second item effectiveness level 46 (shown as "Level 68").

The implantation of a determined effectiveness level may be imperceptible to the user. The implementation of the determined effectiveness level may be a background process executed by the item effectiveness module 22 such that the user is unaware of the implementation.

The implantation of a determined effectiveness level may be perceptible to the user. The implementation of the determined effectiveness level may be a foreground process executed by the item effectiveness module 22 such that the user is aware of the implementation.

The server 12, client computing platforms 28, and/or external resources 30 may be operatively linked via one or more electronic communication links. For example, such electronic communication links may be established, at least in part, via a network 26 such as the Internet and/or other networks. It will be appreciated that this is not intended to be limiting, and that the scope of this disclosure includes implementations in which servers 12, client computing platforms 28, and/or external resources 30 may be operatively linked via some other communication media.

The external resources 30 may include sources of information, hosts and/or providers of virtual environments outside of system 10, external entities participating with system 10, and/or other resources. In some implementations, some or all of the functionality attributed herein to external resources 30 may be provided by resources included in system 10.

The server 12 may include electronic storage 24, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 24 may comprise electronic storage media that electronically stores information. The electronic storage media of electronic storage 24 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 24 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 24 may include one or more virtual storage resources (e.g., cloud storage, a virtual private network, and/or other virtual storage resources). Electronic storage 24 may store software algorithms, information determined by processor 14, information received from server 12, information received from client computing platforms 28, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute modules 16, 18, 20, 22, 25. Processor 14 may be configured to execute modules 16, 18, 20, 22, 25 by software; hardware; firmware; some combination of software, hardware, and/or firmware; and/or other mechanisms for configuring processing capabilities on processor 14.

It should be appreciated that although modules 16, 18, 20, 22, 25 are illustrated in FIG. 1 as being co-located within a single processing unit, in implementations in which processor 14 includes multiple processing units, one or more of modules 16, 18, 20, 22, 25 may be located remotely from the other modules. The description of the functionality provided by the different modules 16, 18, 20, 22, 25 described above is for illustrative purposes, and is not intended to be limiting, as any of modules 16, 18, 20, 22, 25 may provide more or less functionality than is described. For example, one or more of modules 16, 18, 20, 22, 25 may be eliminated, and some or all of its functionality may be provided by other ones of modules 16, 18, 20, 22, and/or 25, and/or other modules. As another example, processor 14 may be configured to execute one or more additional modules that may perform some or all of the functionality attributed below to one of modules 16, 18, 20, 22, 25.

Figure 3:
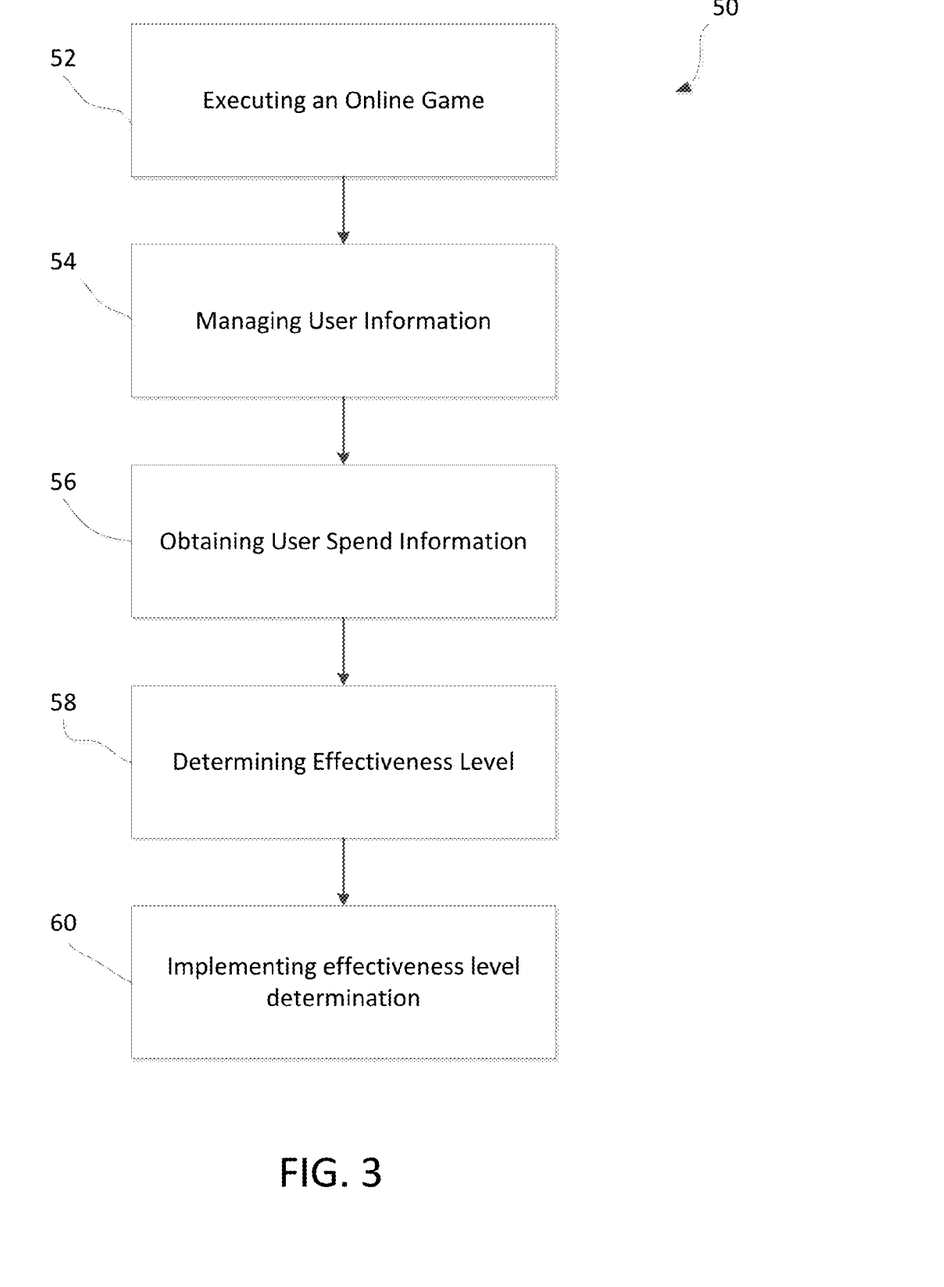
FIG. 3 illustrates a method of hosting a virtual space to client computing devices for interaction by users.
Figure 4:
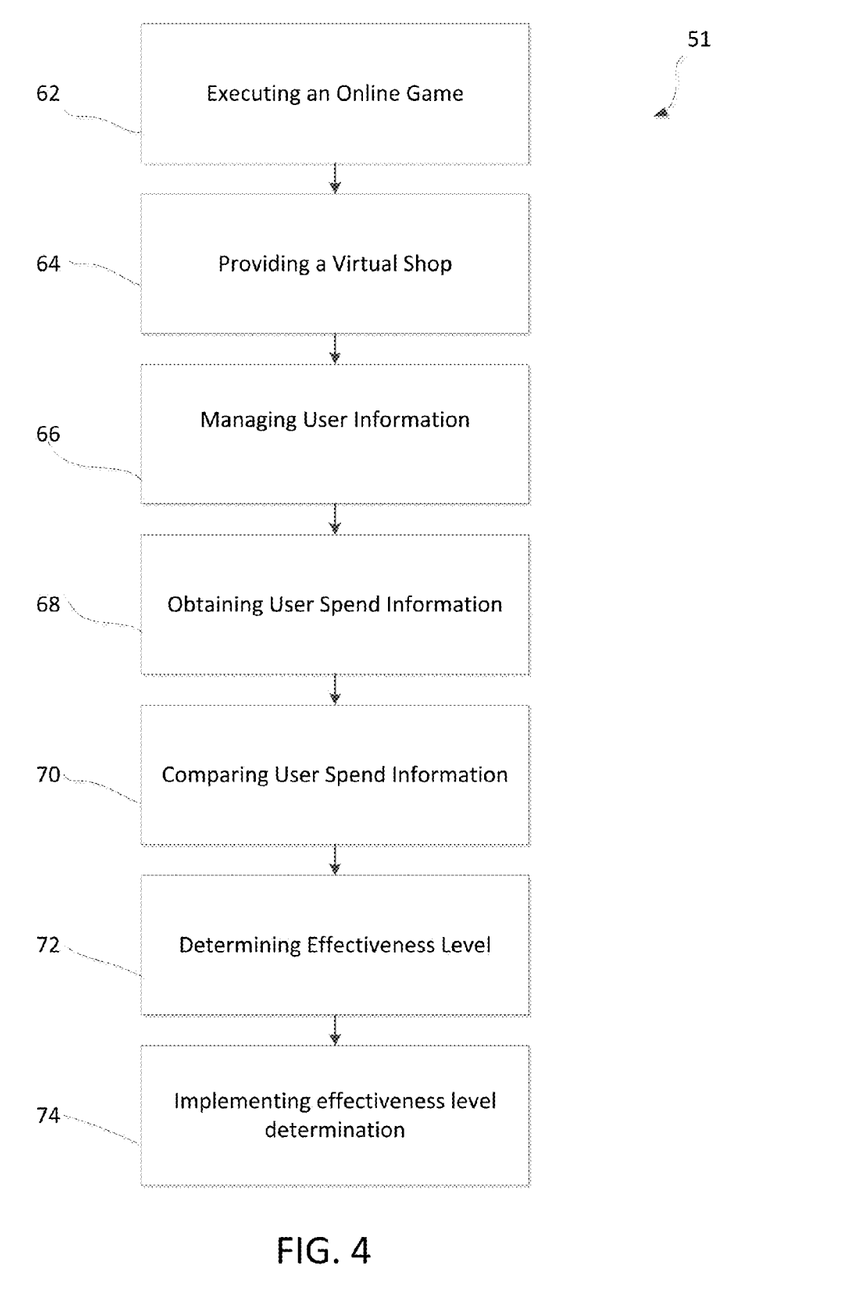
FIG. 4 illustrates a method of hosting a virtual space to client computing devices for interaction by users.

FIG. 3 and FIG. 4 illustrate methods 50, 51, respectively, of hosting a virtual space to client computing devices 28 for interaction by users. The operations of methods 50, 51 presented below are intended to be illustrative. In some embodiments, methods 50, 51 may be accomplished with one or more additional operations not described, and/or without one or more of the operations discussed. Additionally, the order in which the operations of methods 50, 51 are illustrated in FIG. 3 and FIG. 4 and described below are not intended to be limiting.

In some embodiments, methods 50, 51 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 50, 51 in response to instructions stored electronically on an electronic storage medium. The one or more processing devices may include one or more devices configured through hardware, firmware, and/or software to be specifically designed for execution of one or more of the operations of methods 50, 51.

Referring now to method 50 in FIG. 3, at an operation 52 an instance of an online game may be provided to users. The online game may facilitate participation of the users in the online game. In some implementations, operation 52 may be performed by a game module the same as or similar to game module 16 (shown in FIG. 1 and described herein).

At an operation 54, user information may be managed. The user information may include inventories of virtual items available for use by the user in the online game. The user information may include a first user. The user information may include a first inventory of virtual items available for use by the first user. In some implementations, operation 54 may be performed by a user module the same as or similar to the user module 18 (shown in FIG. 1 and described herein).

At an operation 56, user spend information may be obtained. The user spend information may characterize past spending by the users on virtual items. The user spend information may include a first user spend information that characterizes past spending by the first user on virtual items. In some implementations, operation 56 may be performed by a spend history module the same as or similar to spend history module 20 (shown in FIG. 1 and described herein).

At an operation 58, a determination of the effectiveness of virtual items may be made. The determination may be based on user spend information. In some implementations, operation 58 may be performed by an item effectiveness module the same as or similar to item effectiveness module 22 (shown in FIG. 1 and described herein).

At an operation 60, a change in or setting of the effectiveness of virtual items may be implemented. The changing or setting may include a change in or setting of the effectiveness levels of one or more attributes associated with the virtual items. In some implementations, operation 60 may be performed by an item effectiveness module the same as or similar to item effectiveness module 22 (shown in FIG. 1 and described herein).

Returning now to method 51 in FIG. 4, at an operation 62 an instance of an online game may be provided to users. The online game may facilitate participation of the users in the online game. In some implementations, operation 62 may be performed by a game module the same as or similar to game module 16 (shown in FIG. 1 and described herein).

At an operation 64, a virtual shop may be provided. The virtual shop may facilitate offers for purchase of virtual items for use by the users. Purchase of virtual items may include purchase using virtual currency. In some implementations, operation 64 may be performed by a shop module the same as or similar to shop module 25 (shown in FIG. 1 and described herein).

At an operation 66, user information may be managed. The user information may include inventories of virtual items available for use by the user in the online game. The user information may include a first user. The user information may include a first inventory of virtual items available for use by the first user. In some implementations, operation 66 may be performed by a user module the same as or similar to the user module 18 (shown in FIG. 1 and described herein).

At an operation 68, user spend information may be obtained. The user spend information may characterize past spending by the users on virtual items. The user spend information may include a first user spend information that characterizes past spending by the first user on virtual items. In some implementations, operation 68 may be performed by a spend history module the same as or similar to spend history module 20 (shown in FIG. 1 and described herein).

At operation 70, a comparison of user spend information between multiple users may be made. The comparison may include comparing user spend information between multiple users to determine an effectiveness level of virtual items as performed in operation 72 below. The comparison may including comparing a first user spend information with a second user spend information. In some implementations, operation 70 may be performed by a spend history module the same as or similar to spend history module 20 (shown in FIG. 1 and described herein).

At an operation 72, a determination of the effectiveness of virtual items may be made. The determination may be based on user spend information. The determination may be made based on the comparison between multiple users spend information as performed in operation 70 above. In some implementations, operation 72 may be performed by an item effectiveness module the same as or similar to item effectiveness module 22 (shown in FIG. 1 and described herein).

At an operation 74, a change in or setting of the effectiveness of virtual items may be implemented. The changing or setting may include a change in or setting of the effectiveness levels of one or more attributes associated with the virtual items. In some implementations, operation 74 may be performed by an item effectiveness module the same as or similar to item effectiveness module 22 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online gaming system allowing adjustment of the effectiveness of virtual items, the system comprising:
    one or more processors configured by machine-readable instructions to:
        execute an instance of an online game, and to implement the instance of the online game to facilitate participation of users in the online game,
        manage user information associated with the users in the online game, the user information including inventories of virtual items available for use by the users in the online game, the user information including a first user information including a first inventory of virtual items available for use by a first user;
        obtain user spend information that characterizes past spending by the users on virtual items, the user spend information including first user spend information that characterizes past spending by the first user on virtual items;
        configured to determine an effectiveness level of virtual items in the online game based on the user spend information characterizing the past spending by the users on virtual items, such that the effectiveness level of a first item in the first inventory is determined based on the first user spend information characterizing the past spending by the first user on virtual items, and wherein the effectiveness level of the first item is different than an effectiveness level determined for a second item such that the first item and the second item are the same item but have one or more differing attributes that affect use during gameplay, and
    wherein implementation of the effectiveness level of virtual items determined is imperceptible to the users such that the users are unaware of the implementation, wherein the implementation of the effectiveness level determined for the first item for the first user is imperceptible to the first user such that the first user is unaware of the implementation of the effectiveness level determined for the first item.

2. The system of claim 1 wherein the one or more processors are further configured by machine-readable instructions to:

present the virtual items to the users in a virtual shop within the online game, the virtual shop allowing purchase of one or more virtual items available for use by users of the online game using virtual currency.

3. The system of claim 1 wherein the one or more processors are further configured by machine-readable instructions such that determining the effectiveness level of the first virtual item comprises an adjustment from a base effectiveness level of the first item.

4. The system of claim 3, wherein the adjustment from the base effectiveness level of the first item is determined by the first user spending information.

5. The system of claim 1 wherein the one or more processors are further configured by machine-readable instructions to:
manage user information comprising second user information including second inventory of virtual items available for use by a second user, the second inventory including a second virtual item;
obtain user spend information including second user spend information that characterizes past spending by the second user on virtual items; and
determine the effectiveness level of the second item based on the second user spend information.

6. The system of claim 5 wherein the one or more processors are configured by machine-readable instructions such that responsive to the first user spend information and the second user spend information indicating a greater spend frequency for the first user than the second user, the first item effectiveness level is determined to be less than the second item effectiveness level.

7. The system of claim 5 wherein the one or more processors are configured by machine-readable instructions such that responsive to the first user spend information and the second user spend information indicating a greater spend velocity for the first user than the second user, the first item effectiveness level is determined to be less than the second item effectiveness level.

8. The system of claim 5 wherein the one or more processors are configured by machine-readable instructions such that responsive to the first user spend information and the second user spend information indicating a greater total spend amount for the first user than the second user, the first item effectiveness level is determined to be less than the second item effectiveness level.

9. The system of claim 1 wherein the one or more processors are further configured by machine-readable instructions such that the determination of the effectiveness of the virtual item implements setting one or more attributes of the virtual item.

10. A computer-implemented method for adjusting the effectiveness of virtual items in an online game based on past user spending, the method being implemented in a computer system that includes one or more physical processors and storage media storing machine-readable instructions, the method comprising:
executing an instance of an online game;
managing first user information including a first inventory of virtual items available for use by a first user;
obtaining a first user spend information that characterizes past spending by the first user on virtual items; and,
determining an effectiveness level of a first item in the first inventory based on the first user spend information characterizing the past spending by the first user on virtual items, wherein the effectiveness level of the first item is different than an effectiveness level determined for a second item such that the first item and the second item are the same item but have one or more differing attributes that affect use during gameplay, and
wherein implementation of the effectiveness level determined for the first item for the first user is imperceptible to the first user such that the first user is unaware of the implementation of the effectiveness level determined for the first item.

11. The method of claim 10 further comprising;
providing a virtual shop configured to present virtual items to users, the virtual shop allowing purchase of one or more virtual items available for use by users of the online game using virtual currency.

12. The method of claim 10 wherein determining the effectiveness level of the first virtual item further comprises;
adjusting the effectiveness level of the first virtual item from a base effectiveness level of the first virtual item.

13. The method of claim 12 wherein the adjustment from the base effectiveness level of the first item is determined by the first user spending information.

14. The method of claim 10 further comprising;
managing second user information including a second inventory of virtual items available for use by a second user;
obtaining a second user spend information that characterizes past spending by the second user on virtual items; and,
determining an effectiveness level of a second item in the second inventory based on the second user spend information.

15. The method of claim 14 further comprising;
responsive to the first user spend information and the second user spend information indicating a greater spend frequency for the first user than the second user, determining the first item effectiveness level to be less than the second item effectiveness level.

16. The method of claim 14 further comprising;
responsive to the first user spend information and the second user spend information indicating a greater spend velocity for the first user than the second user, determining the first item effectiveness level to be less than the second item effectiveness level.

17. The method of claim 14 further comprising;
responsive to the first user spend information and the second user spend information indicating a greater total spend amount for the first user than the second user, determining the first item effectiveness level to be less than the second item effectiveness level.

18. The method of claim 10 wherein determining the effectiveness level of the first virtual item further comprises setting one or more of the attributes of the first virtual item.

* * * * *